(12) United States Patent
Forster (10) Patent No.: US 11,705,617 B2
(45) Date of Patent: Jul. 18, 2023

(54) PAD STRUCTURES FOR ANTENNAS THAT ALLOW MULTIPLE ORIENTATIONS WITH RFID STRAPS

(71) Applicant: Avery Dennison Retail Information Services, LLC, Mentor, OH (US)

(72) Inventor: Ian J. Forster, Chelmsford (GB)

(73) Assignee: Avery Dennison Retail Information Services, LLC, Mentor, OH (US)

( * ) Notice: Subject to any disclaimer, the term of this patent is extended or adjusted under 35 U.S.C. 154(b) by 97 days.

(21) Appl. No.: 17/112,965

(22) Filed: Dec. 4, 2020

(65) Prior Publication Data

US 2021/0175602 A1     Jun. 10, 2021

Related U.S. Application Data

(60) Provisional application No. 62/943,499, filed on Dec. 4, 2019.

(51) Int. Cl.
  *H01Q 1/22*     (2006.01)
  *H01Q 1/12*     (2006.01)
  *H01Q 1/08*     (2006.01)

(52) U.S. Cl.
  CPC .......... *H01Q 1/2208* (2013.01); *H01Q 1/085* (2013.01); *H01Q 1/1207* (2013.01)

(58) Field of Classification Search
  CPC .... H01Q 1/2208; H01Q 1/085; H01Q 1/1207; H04B 5/0062
  See application file for complete search history.

(56) References Cited

U.S. PATENT DOCUMENTS

| 7,292,148 | B2 | 1/2007 | Forster | |
|---|---|---|---|---|
| 7,262,701 | B1 * | 8/2007 | Nguyen | H01Q 21/205 343/822 |
| 9,251,456 | B2 * | 2/2016 | Omura | G06K 19/08 |
| 9,600,758 | B2 | 3/2017 | Jeppesen | |
| 2006/0244600 | A1 * | 11/2006 | Baba | G06K 19/0775 340/572.1 |
| 2007/0273527 | A1 * | 11/2007 | Yamagajo | H01Q 9/065 340/572.7 |
| 2008/0158092 | A1 * | 7/2008 | Yakubo | H01Q 1/2283 343/866 |
| 2008/0314993 | A1 * | 12/2008 | Baba | H01Q 7/00 235/492 |
| 2016/0321535 | A1 * | 11/2016 | Ban | G06K 19/07786 |
| 2021/0034939 | A1 * | 2/2021 | Ueki | G06K 19/0723 |

FOREIGN PATENT DOCUMENTS

WO     2000/043952     7/2000

\* cited by examiner

*Primary Examiner* — Ricardo I Magallanes
*Assistant Examiner* — Yonchan J Kim (57) ABSTRACT

In some embodiments, a radio frequency identification (RFID) tag system includes a first strap mounting pad of an RFID antenna component, and a second strap mounting pad of the RFID antenna component, the second strap mounting pad being electrically coupled to the first RFID strap mounting pad. At least one of the first strap mounting pad and the second strap mounting pad may extend diagonally with respect to a wide edge direction of the antenna component, thus making the RFID antenna component configured to receive both a strap that is parallel to a wide edge direction of the antenna component and a strap that is perpendicular to a wide edge direction of the antenna component.

21 Claims, 8 Drawing Sheets

Fig. 1A
(Prior Art)
Amended

Fig. 1B
(Prior Art)
Amended

PAD STRUCTURES FOR ANTENNAS THAT ALLOW MULTIPLE ORIENTATIONS WITH RFID STRAPS

CROSS-REFERENCE TO RELATED APPLICATION

The present application claims the benefit of U.S. Provisional Patent Application No. 62/943,499 filed Dec. 4, 2019, which incorporated herein by reference in its entirety.

BACKGROUND

Generally stated, radio-frequency identification is the use of electromagnetic energy to stimulate a responsive device (known as an RFID "tag" or transponder) to identify itself and, in some cases, provide additional information and/or data stored in the tag. RFID tags typically comprise a semiconductor device commonly referred to as the "chip", upon which are formed a memory and an operating circuitry, which is connected to an antenna. Typically, RFID tags act as transponders, providing information stored in the chip memory in response to a radio frequency interrogation signal received from a reader, also referred to as an interrogator. In the case of passive RFID devices, the energy of the interrogation signal also provides the necessary energy to operate the RFID tag device.

Antenna types are very diverse, as are the methods of constructing the same. One method of making RFID tags is to use a strap, which may be a small device with an RFID chip connected to two or more conductors that can be coupled to an antenna. The coupling of the conductors to the antenna can be achieved using a conductive connection, an electric field connection, magnetic connection or a combination of coupling methods. However, as explained below, historically, the orientation of the strap and antenna relative to the underlying web to which it is attached could affect antenna performance and necessitate additional tuning.

Antennas for RFID tags are generally manufactured in one of two orientations with respect to the moving web that they are created on or attached to. The first orientation may be generally described as wide edge leading (WEL), meaning that the maximum length of the tag antenna is positioned across the web. The second orientation is generally described as narrow edge leading (NEL), meaning that the minimum length of the antenna is positioned across the web.

For mounting efficiency, RFID straps are generally placed across the web in a WEL orientation regardless of whether the antenna is in a WEL orientation or a NEL orientation. To accommodate the WEL orientation of the strap, an antenna that is converted from WEL orientation to NEL orientation may require redesign, recalculation, retesting, and potentially retuning, all of which may require time, cost, and/or effort. Accordingly, there is a long felt need to make improvements over the existing state of the art to potentially reduce excess use of time, cost, and/or effort.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

In some embodiments, a radio frequency identification (RFID) tag system includes a first strap mounting pad of an RFID antenna component, and a second strap mounting pad of the RFID antenna component, the second strap mounting pad being electrically coupled to the first RFID strap mounting pad. At least one of the first strap mounting pad and the second strap mounting pad extends diagonally with respect to a wide edge direction of the antenna component, thus making the RFID antenna component configured to receive both a strap that may be parallel to a wide edge direction of the antenna component and a strap that may be perpendicular to a wide edge direction of the antenna component.

The first strap mounting pad may include a first branch and a second branch. The second strap mounting pad may include a third branch and a fourth branch. The second strap mounting pad may be round. The first branch and the second branch may define a channel. The first branch and the second branch may have the same width. The first branch and the second branch may have different widths. The first strap mounting pad may include an intersection that the first branch and the second branch each extend from, and the first branch and the second branch may each widen in width as they extend away from the intersection.

The first strap mounting pad and the second strap mounting pad may collectively have a rounded exterior border. The first strap mounting pad and the second strap mounting pad may collectively have a circular exterior border. A strap axis of symmetry may extend between a center of the first mounting pad and the second mounting pad, and the axis of symmetry may be oriented diagonally with respect to the wide edge direction.

The system further may include an antenna substrate web supporting a wide edge leading antenna. The first branch and the second branch may be symmetrically formed. The first branch and the second branch may be asymmetrically formed. The system further includes a strap that may be attached to the first strap mounting pad and the second strap mounting pad. The system may further include an antenna coupled to the RFID antenna component.

The antenna has a first set of radio frequency characteristics when an RFID strap may be attached to the first strap mounting pad and the second strap mounting pad parallel to an antenna wide edge direction, and the antenna may have a second set of radio frequency characteristics when the RFID strap may be attached to the first strap mounting pad and the second strap mounting pad perpendicular to the antenna wide edge direction. The second set of radio frequency characteristics may be within a threshold percentage greater than and less than the first set of radio frequency characteristics. The threshold percentage may be one of 1%, 2%, 3%, 4%, 5%, 6%, 7%, 8%, 9%, 10%, 12%, 14%, 16%, 18%, 20%, or 25%. The first and second branch may form an arc. The different widths may cause a known and a fixed amount of tuning for an antenna.

In some embodiments, a radio frequency identification (RFID) tag method may include providing a first strap mounting pad of an RFID antenna component and electrically coupling a second strap mounting pad of the RFID antenna component to the first RFID strap mounting pad. At least one of the first strap mounting pad and the second strap mounting pad extends diagonally with respect to a wide edge direction of the antenna component, thus making the RFID antenna component configured to receive both a strap that may be parallel to a wide edge direction of the antenna component and a strap that may be perpendicular to a wide edge direction of the antenna component.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

Various embodiments relate generally to a pad structure for a radio frequency identification (RFID) tag. Some embodiments disclose unique pad structures for radio-frequency identification antennas that allow for the same or similar radio-frequency (RF) characteristics when mounted in different orientations with respect to the antenna and/or other RFID components. Various embodiments may be suitable for wide edge leading (WEL) and narrow edge leading (NEL) orientation formats. Accordingly, the present specification makes specific reference thereto. However, it will be appreciated by those of ordinary skill in the art that aspects are also equally amenable to other like applications and devices.

Figure 1A:
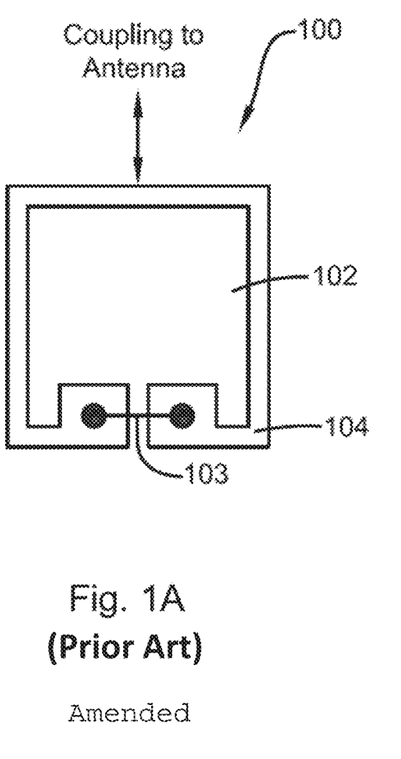
FIG. 1A illustrates a top view of a prior art RFID tag component in a WEL orientation and having a first strap orientation.

In various embodiments, RFID tag components are described, such as one or more of strap mounting pads, inductive loops, antennas, straps, RFID chips, RFID chip mounting pads, strap pads, substrates, and adhesives. In some embodiments, structures including a pair of electrically connected strap mounting pads are disclosed that enable a strap to be attached at two different angles, depending on whether the RFID tag components are being manufactured or assembled with a wide edge leading orientation or a narrow edge leading orientation. In some embodiments, the two different angles may be approximately perpendicular, or may have other relative angles. In various embodiments, an RFID device using an antenna with RFID tag components that permit two different strap attachment orientations may have the same or similar RFID characteristics between both orientations. This may allow for rapid reuse and repurposing of an antenna for either wide edge leading or narrow edge leading manufacturing purposes without incurring the cost, time, and/or resources that may be associated with adapting other designs Referring initially to the drawings, FIG. 1A illustrates a top view of a prior art RFID tag component 100 coupled to an antenna and having a first strap orientation. As noted above, antennas for RFID tag components are generally manufactured in two orientations with respect to the moving web that they are created on or affixed to. The first of those two orientations can be generally described as wide edge leading or WEL, which means that the maximum axis length of the tag antenna is positioned laterally across the web to which it is affixed to or printed on. The second type of orientation can be generally described as narrow edge leading or NEL, which means that the minimum axis length of the antenna is positioned laterally across the web to which it is affixed to or printed on. For mounting efficiency, RFID straps are often placed laterally across the web, although the RFID straps can be placed in other positions as is known in the art.

Figure 1B:
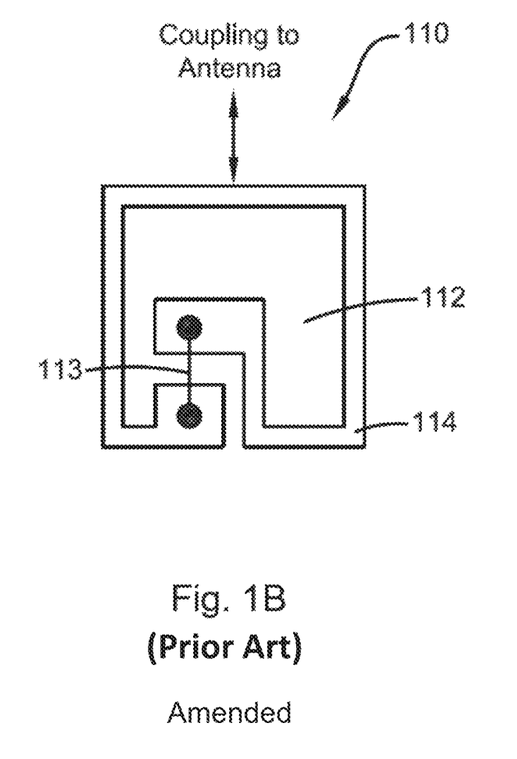
FIG. 1B illustrates a top view of an alternative prior art RFID tag component in a NEL orientation and having a second strap orientation.

As shown in FIG. 1A, RFID tag component 100 is oriented for a horizontal strap conductor 103 and includes a web 102 and an antenna 104 positioned in a WEL orientation. This particular orientation will result in a first resonance and a first inductance. By comparison, FIG. 1B illustrates a top view of an alternative prior art RFID tag component configured for a vertical strap conductor 113 and includes a web 112 and an antenna 114 positioned in a NEL orientation. This particular orientation will result in a different resonance and inductance than those associated with RFID tag component 100 in FIG. 1A.

Unfortunately, as explained above, these differences may result in differing RF characteristics between the two tag components 100, 110, and may necessitate additional tuning and/or changes in antenna design so that the two tag components 100, 110 can operate in substantially the same manner. A key structure of some RFID tag components 100, 110, may be an inductive impedance transformer resonant with the chip capacitance at a specific frequency. The inductive impedance transformer may need to change when an antenna design is transformed from a WEL orientation to a NEL orientation as the RFID strap remains in the WEL orientation. In some embodiments that include an inductive impedance transformer that has changed, the shape of the antenna 104, 114 may also need to change to accommodate this transformation. However, changing the shape of the antenna 104, 114 between a WEL orientation and a NEL orientation may not allow the RFID tags to be considered identical (i.e., operate in substantially the same manner). For example, if the WEL orientation has been qualified as compliant to a specific test, the NEL orientation may need to be retested (and possible tuned) and may not be assumed to also be compliant. In addition, the NEL orientation for some conventional designs may tend to place the RFID strap and the associated bond pads inside the inductive loop in a way that may tend to reduce the overall performance of the RFID tag.

In various embodiments, pad structures may be used for mounting RFID straps to RFID antennas that give the same, similar, or within tolerance RF characteristics when mounted in different orientations with respect to the antenna (e.g., a WEL orientation or a NEL orientation). In some embodiments, such as in FIG. 2, an RFID tag component 200 may provide relatively stable inductance (e.g., similar or having differences within tolerances) regardless of which of the two alternative strap orientations is utilized and without having to change the tuning. A representative example of a vertically oriented RFID strap 206 is illustrated at (a), and a representative example of a horizontally oriented RFID strap is illustrated at (b).

Figure 2:
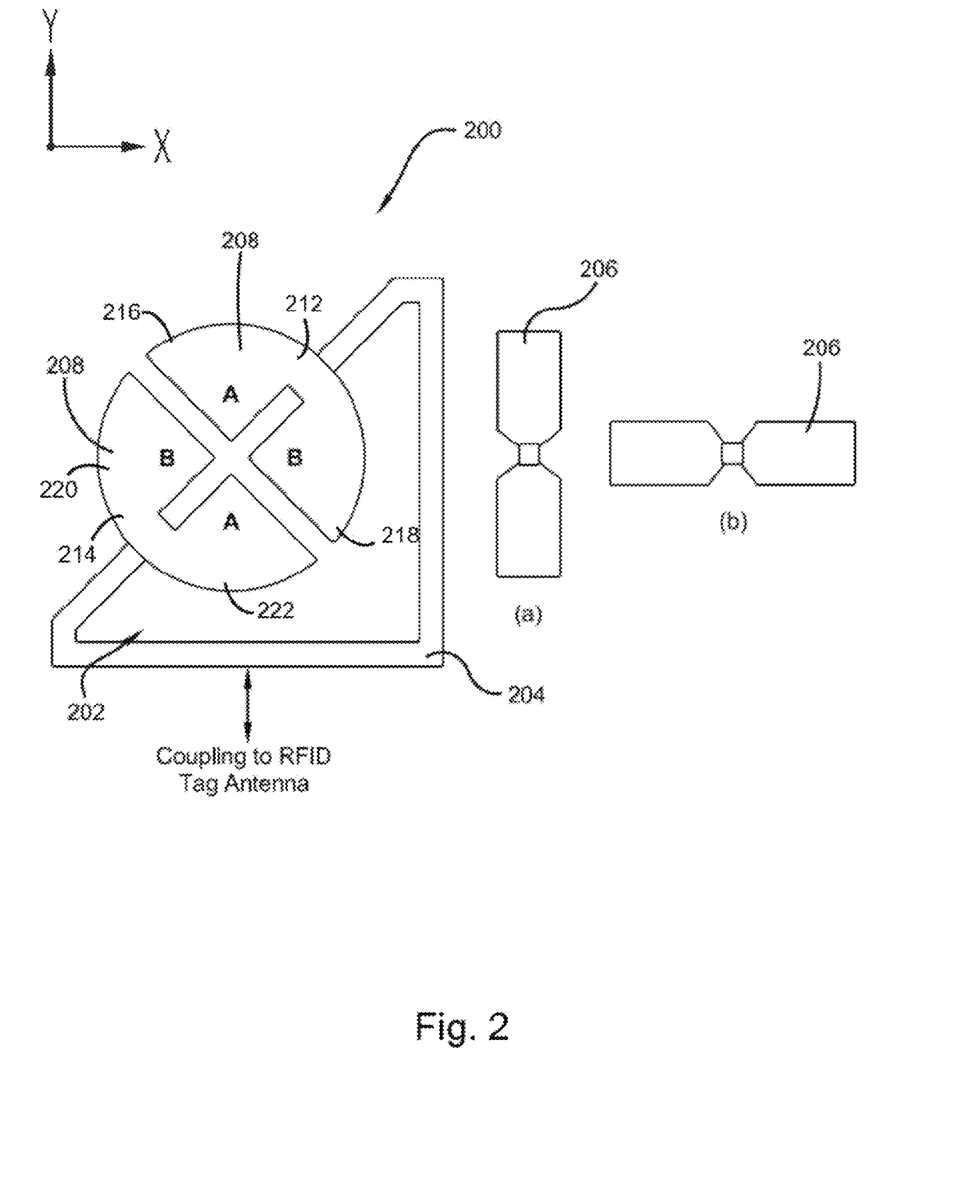
FIG. 2 illustrates a top view of an RFID tag component that provides stable inductance with two alternative strap orientations in accordance with some embodiments.

In various embodiments, the RFID tag component 200 of FIG. 2 includes a pad structure component 202 includes a central impedance transforming loop of the RFID antenna 204, at least two mounting pads 208, and two pairs of branches that provide at least two alternative mounting positions or orientations for the strap 206, namely from A to A (e.g. across AA) and from B to B (e.g., across BB). Mounting pads 208 may include a first strap mounting pad 212, and a second strap mounting pad 214. First strap mounting pad 212 may include a first branch 216 and a second branch 218. Second strap mounting pad 214 may include a third branch 220, and a fourth branch 222. A wide edge direction may be parallel to the X-axis, and a first channel may extend diagonally with respect to the wide edge direction between the mounting pads 208. A second channel may extend perpendicularly to the first channel, and may be defined by the first branch 216 and the second branch 218. The second channel may further be defined by the third branch 220 and the fourth branch 222.

In various embodiments, the mounting pads 208 of pad structure component 202 are designed to be symmetrical to one another in a way that provides at least two different mounting positions for the RFID strap component 206 to be used in either a WEL or NEL configuration. For example, in some embodiments, the mounting pads 208 are mirror images of each other. In addition, in some embodiments, the mounting pads have bilateral symmetry across an axis that extends from a center of one mounting pad 208 to the other mounting pad 208. In some embodiments, a channel extends diagonally between the mounting pads 208, the diagonal being with respect to a wide edge direction, which may be parallel to one of the illustrated sides of the antenna 204. In other embodiments, the antenna 204 may occupy an elongated area such as a rectangular space, with the wide edge direction being parallel to a longer side of the rectangular space. In some embodiments, the antenna 204 may couple (e.g., capacitively or through conduction) with an additional RFID antenna, such as for a label, that has a wide edge leading direction. The antenna 204 may be oriented to couple with the additional RFID antenna such that one of the sides of the antenna 204 is parallel to the wide edge direction of the additional RFID antenna. In other embodiments, the antenna 204 may be rounded rather than having flat sides.

For example, RFID strap 206 may extend from A to A, or from B to B. In some embodiments, using a symmetrical design for the strap mounting pads 208 may cause or help allow the RF characteristics of the central impedance transforming loop of the RFID antenna 204 to remain the same, regardless of whether the RFID strap 206 is connected across AA or across BB. In this manner, identical RFID antennas can be positioned in a NEL orientation or a WEL orientation when the RFID strap 206 is mounted in a WEL orientation, and the RF characteristics of the central impedance transforming loop of the RFID antenna 204 may be the same, similar, or within acceptable, or simply within known tolerances. Example RF characteristics may include one or more of resonant frequency, field strength, impedance, inductance, field shape, and range. Being similar or within acceptable tolerances for a second RFID strap orientation may include being above or below the RF characteristics associated with a first RFID strap orientation by 1%, 2%, 3%, 4%, 5%, 6%, 7%, 8%, 9%, 10%, 12%, 14%, 16%, 18%, 20%, or 25%. In some embodiments, the two strap mounting alternatives may be generally, exactly, or within an acceptable range of being perpendicular to one another. For example, the strap mounting alternatives may be less than 1, 2, 3, 4, 5, 6, 7, 8, 9, 10, 12, 14, 16, 18, 20, or 25 degrees away from a target angle such as 90 degrees.

In various embodiments, the RFID tag component 200 and its various components can be any suitable size, shape, and/or configuration as is known in the art without affecting the overall concept of the invention. One of ordinary skill in the art will appreciate that the shape, size and configuration of the RFID tag component 200 shown in FIG. 2 is for illustrative purposes only, and that many other shapes and sizes of the RFID tag component 200 are well within the scope of the present disclosure. Although the dimensions of the RFID tag component 200 (i.e., length, width, and height) are important design parameters for good performance, the RFID tag component 200 may be any shape or size that provides acceptable performance.

Figure 3:
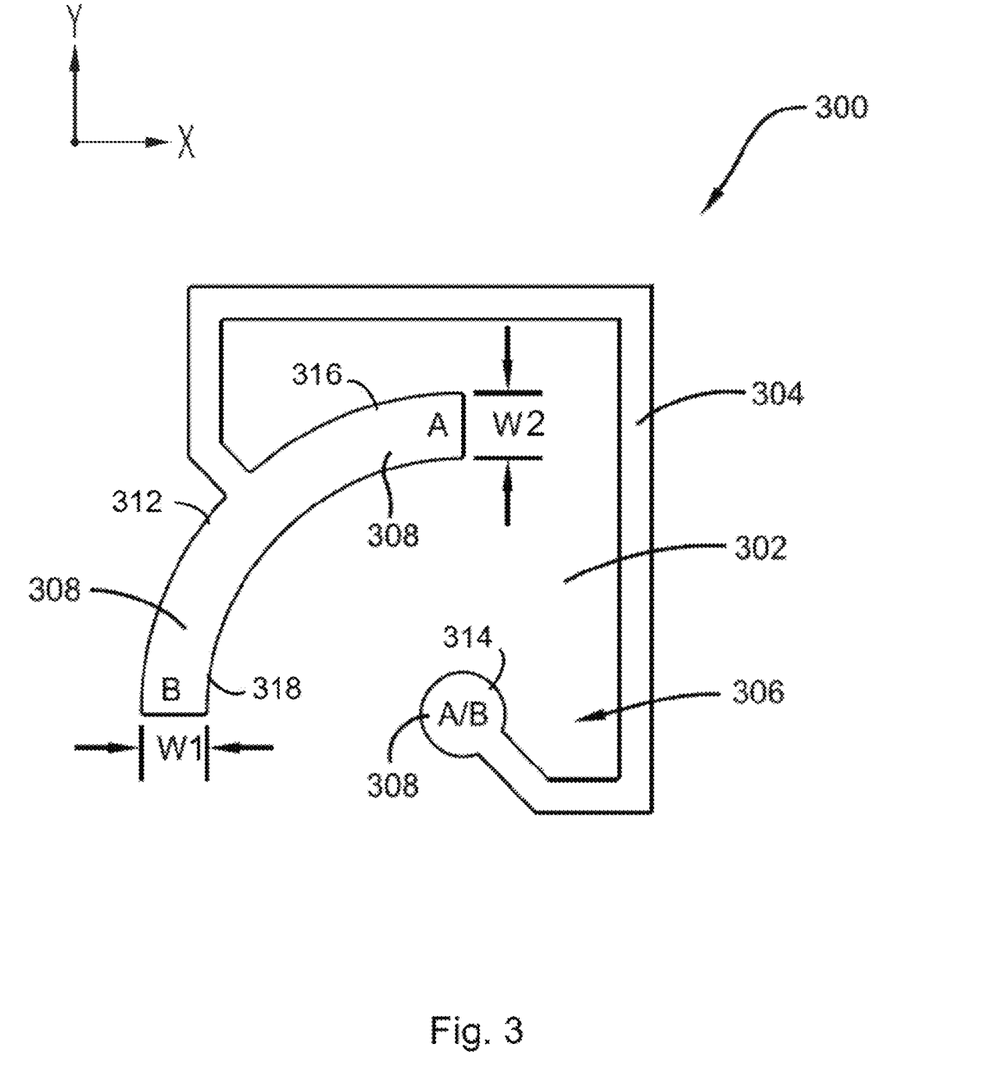
FIG. 3 illustrates a top view of an RFID tag component in accordance with some embodiments.

In various embodiments, such as in FIG. 3, the RFID tag component 300 provides two position stabilizing orientations at a resonant frequency in accordance with some embodiments. In some embodiments, RFID tag component 300 includes one or more of a web 302, an antenna 304, and a pad mounting structure 306. The antenna 304 may have two alternative mounting pads 308 for the RFID strap, namely from A to A and from B to B. The mounting pads 308 may include a first strap mounting pad 312 and a second strap mounting pad 314. The first strap mounting pad 312 may include a first branch 316 and a second branch 318. In various embodiments, the RFID tag component 300, combined with a central impedance transformer, allows mounting positions from A to A and from B to B to be used to achieve RF characteristics of the RFID tag that are the same, substantially the same, or within acceptable tolerances when the transformer is combined with a dipole type structure in either a WEL orientation or a NEL orientation, and without requiring additional tuning. Acceptable tolerances may be above or below a desired target value by 1%, 2%, 3%, 4%, 5%, 6%, 7%, 8%, 9%, 10%, 12%, 14%, 16%, 18%, 20%, or 25%. In various embodiments, the pad mounting structure 306 provides two positions for stabilizing the resonant frequency in position from A to A and from B to B with a capacitive, conductive, or other type of RFID chip strap. A wide edge direction may be parallel to the X-axis, and a first channel may extend diagonally with respect to the wide edge direction between the mounting pads 308.

In some embodiments, such as in FIG. 3, the two mounting pads 308 are differently shaped and are disposed facing one other. For example, while the first strap mounting pad 312 extends in the form of an arc, the second strap mounting pad 314 facing it is circular. This configuration of the mounting pads 308 allows an RFID strap to be mounted along two orientations at from A to A and from B to B while remaining within acceptable performance parameters. For example, the arced shape of the first strap mounting pad 312 and the round shape of the second strap mounting pad 314 may facilitate similar or the same contact between an RFID strap, the first strap mounting pad 312, and the second strap mounting pad 314 when converting between one strap orientation and a second strap orientation. The antenna may be coupled to each of the mounting pads 308 through induction, while other embodiments may include antennas that are conductively and/or inductively coupled to the mounting pads 308. In some embodiments, the first mounting pad 312 extending in the form of an arc has two ends, each having a first width W1 and a second width W2. The first width W1 may be equal to the second width W2. Therefore, the RF characteristics of the RFID tag component 300 having an RFID strap mounted at AA or at AB may be the same, similar, or within acceptable tolerances, as discussed above.

Figure 4:
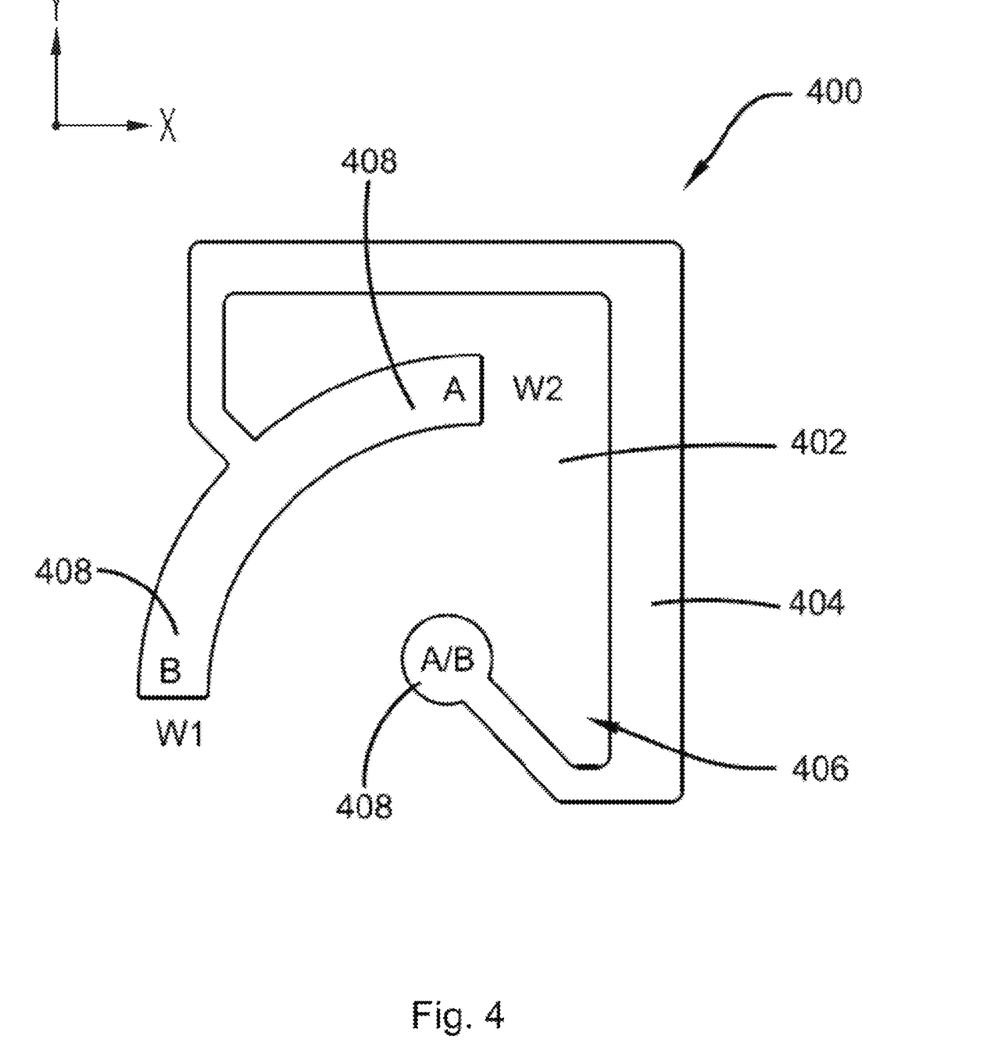
FIG. 4 illustrates a top view of an RFID tag component with asymmetric widths in accordance with some embodiments.

In some embodiments, such as in FIG. 4, an antenna design is disclosed wherein the characteristics of an RFID strap mounted at AA or at BB are not the same, or the first width W1 is not equal to the second width W2. More specifically, RFID straps are commonly coupled to RFID antennas via mounting pads by capacitance that is proportional to area. Therefore, the width W2 of the pad area at A may be designed to differ from the width W1 of the pad area at B, thereby resulting in differing amounts of overlap between the strap mounting pads and the RFID antenna pads. This differing amount of overlap will, in turn, cause a known and fixed amount of RFID antenna tuning. The known and fixed amount of antenna tuning can, in turn, be used to compensate for the differing materials that NEL oriented and WEL oriented antennas are constructed on. For example, a WEL oriented antenna is typically affixed to or placed on an RFID tag or label comprised of a paper face stock capable of receiving printing and that has an adhesive for attaching the RFID tag or label to an object, such as an object that is to be monitored or tracked. By comparison, a NEL oriented antenna may be manufactured as an RFID fabric label, designed for sewing into a garment or other article that is to be monitored or tracked.

In some embodiments, the RFID tag component 400 illustrated in FIG. 4 comprises a web 402, an antenna 404, and a pad structure 406 where the antenna 404 has two alternative mounting positions 408 for the strap, namely from A to A and from B to B. However, the widths namely second width W2 and first width W1 of two opposing ends A and B respectively of the mounting pad that is extending in the form of an arc in this particular embodiment, are intentionally not equal to one another as they were in FIG. 3, thereby causing a known and fixed amount of RFID antenna tuning. As stated above, this antenna tuning can compensate for the materials that a NEL and WEL antenna and hence RFID tag component 400 are made on.

Figure 5:
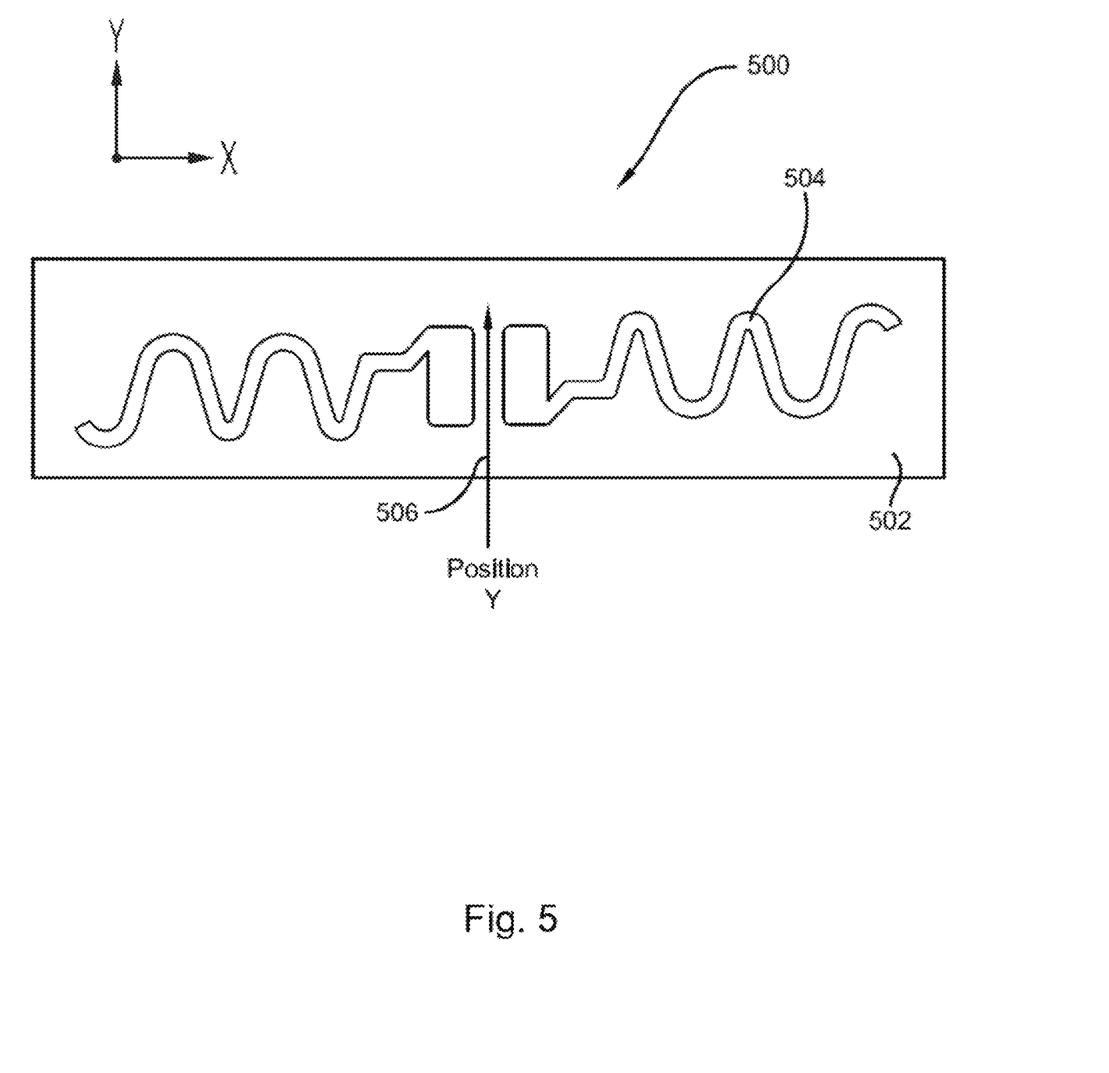
FIG. 5 illustrates a top view of an RFID tag component in accordance with some embodiments.

In some embodiments, such as in FIG. 5 illustrates a top perspective view of a further alternative embodiment of the RFID tag component 500 with a WEL antenna orientation. Specifically, FIG. 5 discloses an RFID tag component 500 comprising a web 502 and an antenna trace 504, wherein the total inductance remains relatively constant with longitudinal movement of the strap portion 506 along the Y axis. Therefore, FIG. 5 discloses position independent characteristics for the RFID strap component 500 to allow position choice to prevent distortion of variable information on the RFID label. Stated differently, the strap mounting portion 506 may be repositioned longitudinally along the Y axis, and relative to the antenna 504, without substantially changing the tuning, as the total inductance is a constant with longitudinal movement of the strap mounting portion 506 along the Y axis. The ability to change the location of the strap mounting portion 506 relative to antenna 504 without changing the tuning has multiple benefits. A wide edge direction may be parallel to the X-axis.

In some embodiments, the mounting portion or position 506 may be changed to make the distortion of the RFID strap move relative to the RFID tag. For example, if the RFID tag is inside a label which is intended to be printed upon, the movement allows the strap distortion to be moved away from a critical printing area, such as a logo or barcode, without requiring the RFID tag to be redesigned. Second, the RFID antenna characteristics remain largely stable with respect to variation of the placement position along the Y axis with respect to the RFID antenna caused by manufacturing tolerances and increasing yield, specifically for narrow band radio frequency identification tags.

Figure 6:
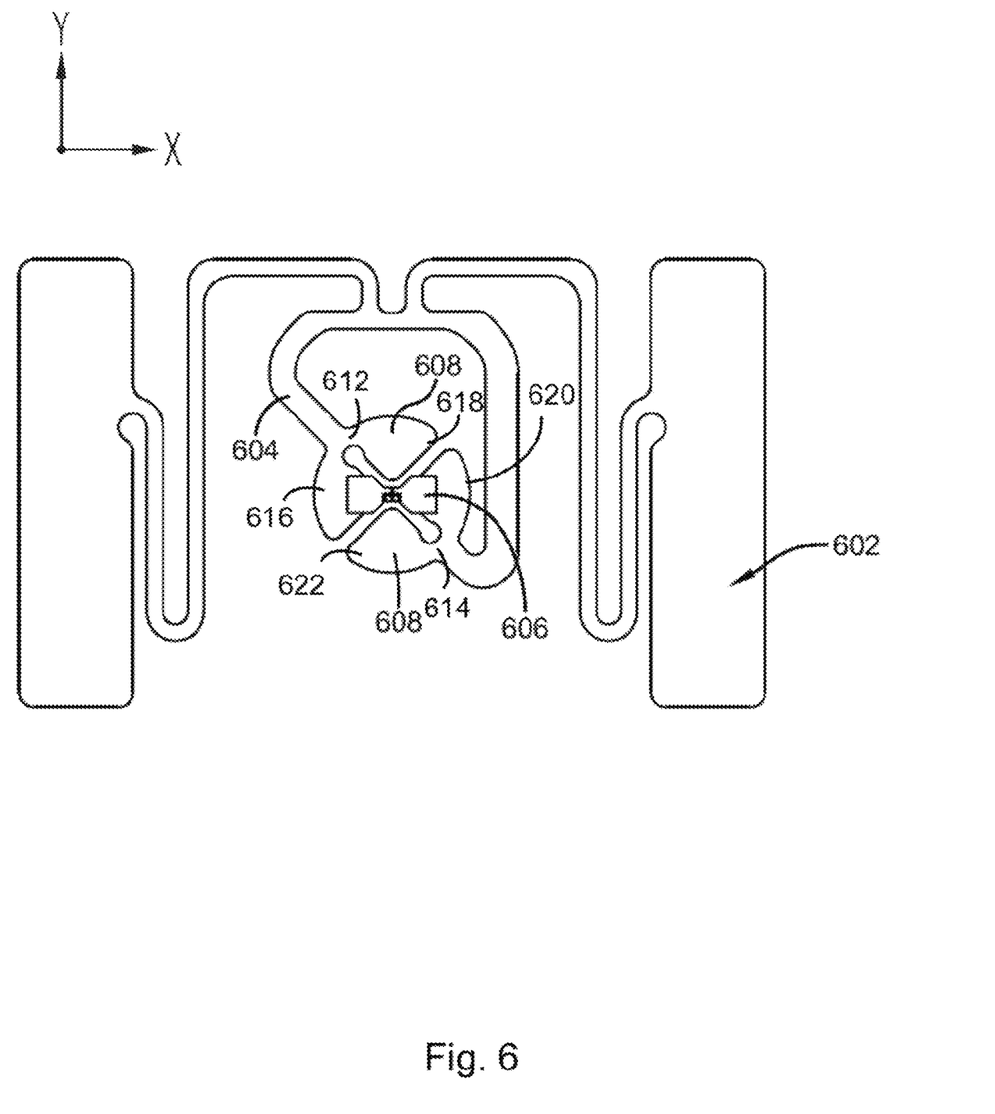
FIG. 6 illustrates a top view of an RFID tag component with a long axis of a strap aligned with a wide edge of an RFID antenna in accordance with some embodiments.

In some embodiments, such as in FIG. 6, an RFID tag component 600 addresses the long felt need for the same exact antenna 604 to be used in a WEL orientation or a NEL orientation without changing the tuning of the same and while maintaining substantially the same RF characteristics. For example, the RFID tag component 600 of FIG. 6 discloses a pad structure 602 comprised of symmetrical and spaced apart mounting pads 608. Mounting pads 608 may include a first strap mounting pad 612, and a second strap mounting pad 614. First strap mounting pad 612 may include a first branch 616 and a second branch 618. Second strap mounting pad 614 may include a third branch 620, and a fourth branch 622. RFID strap 606 may extend horizontally between the spaced apart mounting pads 608, and more specifically, between first branch 616 and third branch 620. A wide edge direction may be parallel or within acceptable tolerances of being parallel to the X-axis, and a first channel may extend diagonally with respect to the wide edge direction between the mounting pads 608. A second channel may extend perpendicularly to the first channel, and may be defined by the first branch 616 and the second branch 618. The second channel may further be defined by the third branch 620 and the fourth branch 622.

In some embodiments, one or more of the first branch 616, the second branch 618, the third branch 620, and the fourth branch 622 may widen as they extend away from a support, such as an intersection between branches. In various embodiments, one or more of the first branch 616, the second branch 618, the third branch 620, and the fourth branch 622 may collectively define a rounded or circular exterior border.

Figure 7:
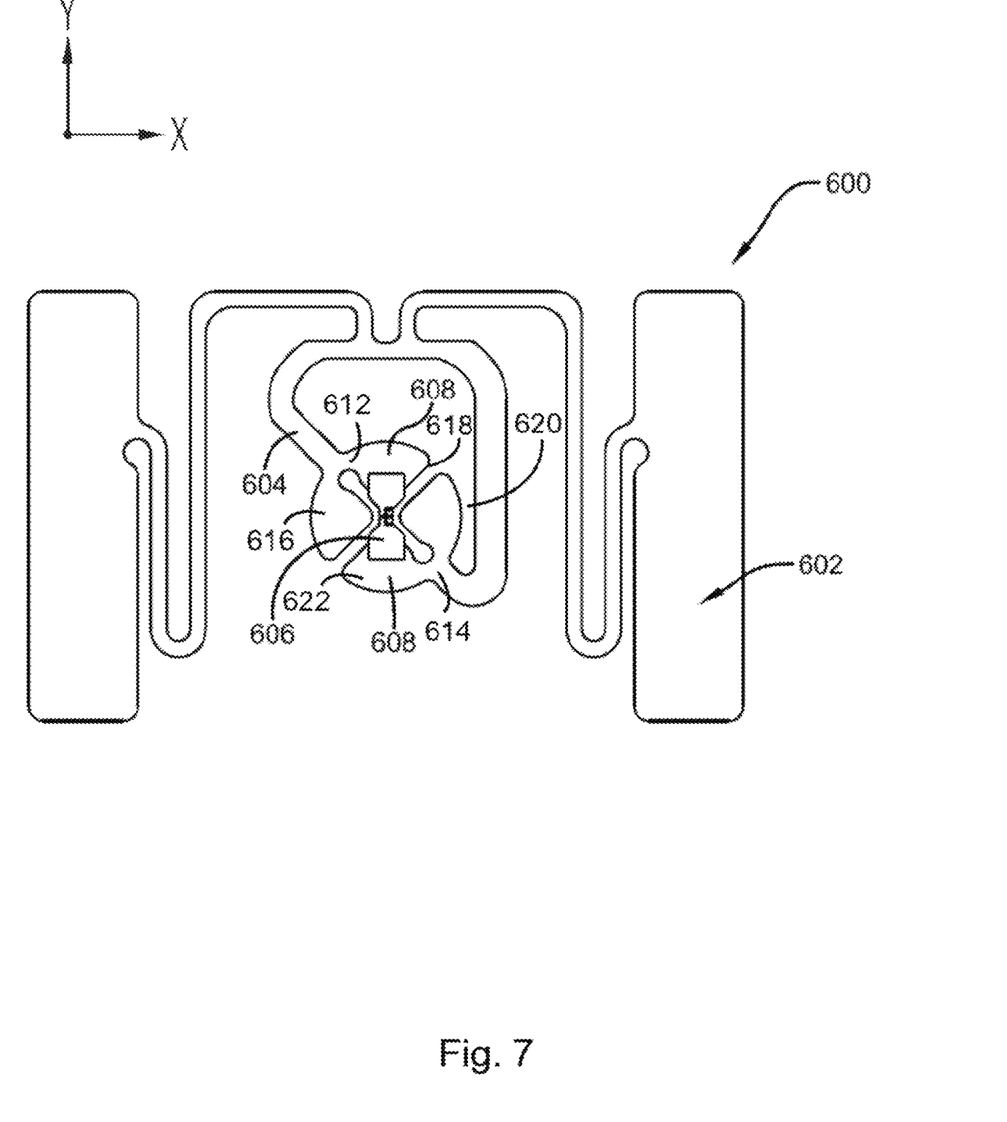
FIG. 7 illustrates a top view of an RFID tag component with a long axis of a strap aligned with a narrow edge of an RFID antenna in accordance with some embodiments.
Figure 8:
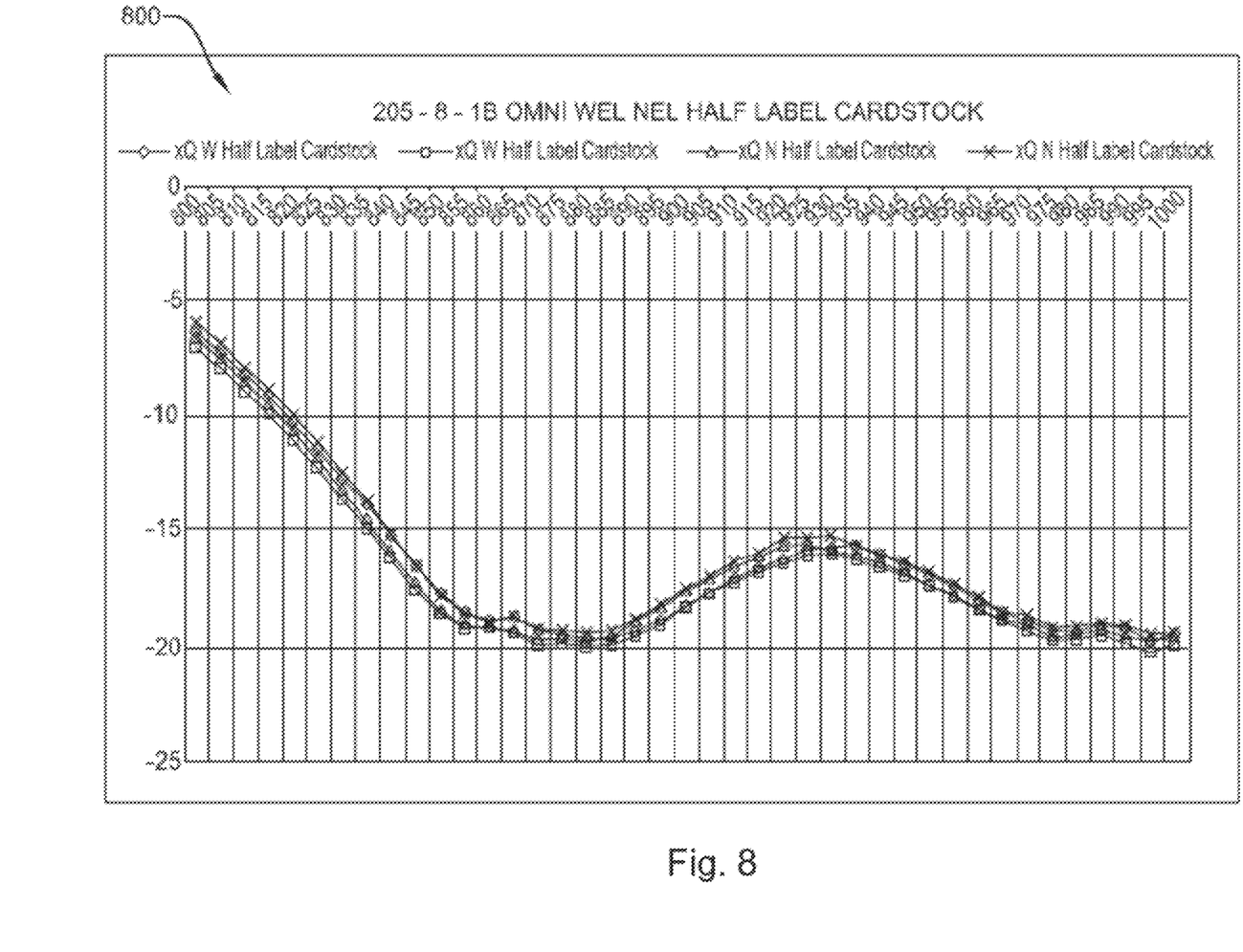
FIG. 8 illustrates a graph of the RF performance of an RFID tag component at both WEL and NEL orientations on half label cardstock and in accordance with some embodiments.

In some embodiments, such as in FIG. 7, RFID strap 606 may extend vertically between the spaced apart mounting pads 608 parallel or within acceptable tolerances of being parallel to a narrow edge leading direction (e.g., along the Y-axis direction) and provide relatively the same inductance as experienced with the horizontal orientation of the strap in FIG. 6. Because the RF characteristics of the central impedance transforming loop is substantially the same regardless of whether the WEL or NEL orientation is used, the exact same antenna 604 can be used in either the WEL or the NEL orientation. In FIG. 7, the FIG. 8 illustrates a graph 800 of the RF performance of an RFID tag component in WEL and NEL orientations on half label cardstock and in accordance with some embodiments. Graph 800 further illustrates that the RFID tag component 600 of FIGS. 6-7 discloses pad structures 602 and mounting pads 608 for mounting RFID straps for RFID antennas 604 that give the same or substantially the same RF characteristics when mounted in different orientations (e.g., horizontally, vertically or at some other acceptable angle) with respect to the antenna 604. More specifically, and as noted above, the mounting pad structure is designed to be inherently symmetrical about where the RFID strap 606 is to be placed so that the connection path to the loop is the same, which results in the RF characteristics of the central impedance transforming loop (shown in FIG. 8) to be substantially the same. In this manner, the same RFID antennas may be used in a WEL orientation or a NEL orientation without requiring a change in the tuning and without materially altering the RF characteristics of the same.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A radio frequency identification (RFID) tag system comprising a first strap mounting pad of an RFID antenna component; and a second strap mounting pad of the RFID antenna component, the second strap mounting pad being electrically coupled to the first strap mounting pad, wherein at least one of the first strap mounting pad and the second strap mounting pad extends diagonally with respect to a wide edge direction of the RFID antenna component, thus making the RFID antenna component configured to receive an RFID strap having a first end and a second end in a first configuration and a second configuration, wherein the first configuration comprising the RFID strap is parallel to the wide edge direction of the RFID antenna component with the first end coupled to only the first strap mounting pad and the second end coupled to only the second strap mounting pad; and wherein the second configuration comprising the RFID strap is perpendicular to the wide edge direction of the RFID antenna component with the first end coupled to only the first strap mounting pad and the second end coupled to only the second strap mounting pad.

2. The RFID tag system of claim 1, wherein the first strap mounting pad comprises a first branch and a second branch.

3. The RFID tag system of claim 2, wherein the second strap mounting pad comprises a third branch and a fourth branch.

4. The RFID tag system of claim 1, wherein the second strap mounting pad is round.

5. The RFID tag system of claim 2, wherein the first branch and the second branch define a channel.

6. The RFID tag system of claim 2, wherein the first branch and the second branch have a same width.

7. The RFID tag system of claim 2, wherein the first branch and the second branch have different widths.

8. The RFID tag system of claim 2, wherein the first strap mounting pad includes an intersection that the first branch and the second branch each extend from, and the first branch and the second branch each widen in width as they extend away from the intersection.

9. The RFID tag system of claim 1, wherein the first strap mounting pad and the second strap mounting pad have a rounded exterior border.

10. The RFID tag system of claim 1, wherein the first strap mounting pad and the second strap mounting pad have a circular exterior border.

11. The RFID tag system of claim 1, wherein a strap axis of symmetry extends between a center of the first mounting pad and the second mounting pad, and the strap axis of symmetry is oriented diagonally with respect to the wide edge direction of the RFID antenna component.

12. The RFID tag system of claim 1, further comprising an antenna substrate web supporting a wide edge leading antenna.

13. The RFID tag system of claim 2, wherein the first branch and the second branch are symmetrically formed.

14. The RFID tag system of claim 2, wherein the first branch and the second branch are asymmetrically formed.

15. The RFID tag system of claim 1, further comprising a strap that is attached to the first strap mounting pad and the second strap mounting pad.

16. The RFID tag system of claim 1, further comprising an antenna coupled to the RFID antenna component.

17. The RFID tag system of claim 16, wherein the antenna has a first set of radio frequency characteristics when the RFID strap is attached to the first strap mounting pad and the second strap mounting pad parallel to an antenna wide edge direction, and the antenna has a second set of radio frequency characteristics when the RFID strap is attached to the first strap mounting pad and the second strap mounting pad perpendicular to the antenna wide edge direction, wherein the second set of radio frequency characteristics are within a threshold percentage greater than and less than the first set of radio frequency characteristics.

18. The RFID tag system of claim 17, wherein the threshold percentage is one of 1%, 2%, 3%, 4%, 5%, 6%, 7%, 8%, 9%, 10%, 12%, 14%, 16%, 18%, 20%, or 25%.

19. The RFID tag system of claim 2, wherein the first and second branch form an arc.

20. The RFID tag system of claim 7, wherein the different widths causes a known and a fixed amount of tuning for an antenna.

21. A radio frequency identification (RFID) tag method comprising: providing a first strap mounting pad of an RFID antenna component; electrically coupling a second strap mounting pad of the RFID antenna component to the first strap mounting pad, wherein at least one of the first strap mounting pad and the second strap mounting pad extends diagonally with respect to a wide edge direction of the RFID antenna component, thus making the RFID antenna component configured to receive an RFID strap having a first end and a second end in a first configuration and a second configuration, wherein the first configuration comprising the RFID strap is parallel to the wide edge direction of the RFID antenna component with the first end coupled to only the first strap mounting pad and the second end coupled to only the second strap mounting pad; and wherein the second configuration comprising the RFID strap is perpendicular to the wide edge direction of the RFID antenna component with the first end coupled to only the first strap mounting pad and the second end coupled to only the second strap mounting pad.

* * * * *